(12) United States Patent
Furrer et al.

(10) Patent No.: US 11,000,151 B2
(45) Date of Patent: May 11, 2021

(54) DEVICE FOR BRINGING BABY FOOD TO A CERTAIN TEMPERATURE

(71) Applicant: MEDELA HOLDING AG, Baar (CH)

(72) Inventors: Etienne Furrer, Cham (CH); Armin Felber, Lucerne (CH); Marcel Muther, Ebikon (CH)

(73) Assignee: MEDELA HOLDING AG, Baar (CH)

( * ) Notice: Subject to any disclaimer, the term of this patent is extended or adjusted under 35 U.S.C. 154(b) by 0 days.

(21) Appl. No.: 16/470,112

(22) PCT Filed: Dec. 11, 2017

(86) PCT No.: PCT/EP2017/082225
§ 371 (c)(1),
(2) Date: Jun. 14, 2019

(87) PCT Pub. No.: WO2018/108814
PCT Pub. Date: Jun. 21, 2018

(65) Prior Publication Data
US 2019/0313843 A1 Oct. 17, 2019

(30) Foreign Application Priority Data

Dec. 15, 2016 (EP) .................... 16204285

(51) Int. Cl.
*A47J 36/24* (2006.01)
*A23L 5/00* (2016.01)
*A61J 9/02* (2006.01)

(52) U.S. Cl.
CPC ............ *A47J 36/2433* (2013.01); *A23L 5/00* (2016.08); *A47J 36/2438* (2013.01); *A61J 9/02* (2013.01); *A47J 2202/00* (2013.01)

(58) Field of Classification Search
CPC ............ A47J 36/2433; A47J 2202/00; A47J 36/2438; A47J 27/56–27/575;
(Continued)

(56) References Cited

U.S. PATENT DOCUMENTS

| 1,806,004 A | * | 5/1931 | Tavender ............ A47J 36/2433 219/433 |
| 2,595,685 A | * | 5/1952 | Mallory .................. A47J 36/24 165/120 |

(Continued)

FOREIGN PATENT DOCUMENTS

| CN | 103479523 A | 1/2014 |
| CN | 102006806 B | 6/2014 |

(Continued)

OTHER PUBLICATIONS

International Search Report for International Application No. PCT/EP2017/082225, dated Feb. 7, 2018.

*Primary Examiner* — Drew E Becker
(74) *Attorney, Agent, or Firm* — Marshall, Gerstein & Borun LLP

(57) ABSTRACT

A device for bringing baby food to a certain temperature comprises a vessel having an interior for accommodating a holder for the baby food, a unit for obtaining a temperature for bringing the interior to a certain temperature, and a first sensor for determining the temperature in interior. A second sensor is present for determining the temperature of the baby food in the container. As a result, baby food can be brought to a certain temperature in a manner that is gentle, yet efficient.

12 Claims, 3 Drawing Sheets

(58) Field of Classification Search
CPC . A47J 27/62–27/64; A47J 36/24–36/30; A61J 9/02; A23L 23/00; A23L 5/00; A23C 3/02–3/027
USPC .......... 426/520–522, 117, 231–232, 130
See application file for complete search history.

(56) References Cited

U.S. PATENT DOCUMENTS

| | | | | |
|---|---|---|---|---|
| 2,640,907 | A * | 6/1953 | Morey | A47J 36/2433 219/433 |
| 2,648,226 | A * | 8/1953 | Finch | A61J 9/02 374/150 |
| 2,755,665 | A * | 7/1956 | Muncheryan | A61J 9/02 374/150 |
| 2,756,031 | A | 7/1956 | Sanstrom | |
| 2,769,564 | A * | 11/1956 | Hoggren | A23C 3/031 220/573.4 |
| 2,814,202 | A * | 11/1957 | Frans | A61J 9/02 374/150 |
| 2,981,108 | A * | 4/1961 | Andersen | A61J 11/002 374/150 |
| 3,111,574 | A * | 11/1963 | Spini | A01J 11/00 392/448 |
| 3,247,360 | A * | 4/1966 | Ponder | A47J 36/2433 219/436 |
| 3,567,059 | A * | 3/1971 | Littman | A61J 9/02 215/11.2 |
| 5,208,896 | A * | 5/1993 | Katayev | A47J 36/2433 219/432 |
| 5,553,941 | A * | 9/1996 | Cope | A61J 9/02 215/11.2 |
| 6,417,498 | B1 | 7/2002 | Shields et al. | |
| 8,809,745 | B1 * | 8/2014 | Scarberelli | A47J 36/2438 219/436 |
| 8,960,992 | B2 | 2/2015 | Jong et al. | |
| 2003/0074903 | A1 * | 4/2003 | Upadhye | F25D 31/005 62/3.3 |
| 2004/0140304 | A1 * | 7/2004 | Leyendecker | F25B 21/04 219/386 |
| 2004/0247015 | A1 * | 12/2004 | Wojan | G01K 1/14 374/120 |
| 2005/0205546 | A1 * | 9/2005 | Bauer | A47J 36/2438 219/386 |
| 2006/0213205 | A1 * | 9/2006 | Reverendo | A47J 36/2411 62/3.3 |
| 2006/0286255 | A1 * | 12/2006 | Xu | A47J 43/0716 426/589 |
| 2008/0041859 | A1 * | 2/2008 | Teglbjarg | A47J 36/2433 220/592.16 |
| 2008/0199164 | A1 | 8/2008 | Wortley | |
| 2008/0251063 | A1 * | 10/2008 | Palena | A61J 9/02 126/263.09 |
| 2009/0208193 | A1 | 8/2009 | Bauer et al. | |
| 2009/0255647 | A1 * | 10/2009 | Lim | A47J 36/2433 165/61 |
| 2011/0033587 | A1 | 2/2011 | Jong et al. | |
| 2011/0062149 | A1 * | 3/2011 | Driel | A47J 36/2433 219/618 |
| 2012/0061376 | A1 * | 3/2012 | McBean | A47J 36/2438 219/430 |
| 2012/0085724 | A1 * | 4/2012 | Barker | A61J 9/02 215/11.2 |
| 2013/0098862 | A1 * | 4/2013 | Yi | A47J 36/2433 215/11.2 |
| 2014/0073252 | A1 | 3/2014 | Lee et al. | |
| 2014/0190357 | A1 * | 7/2014 | Mak | A47J 36/2438 99/453 |
| 2015/0068720 | A1 * | 3/2015 | Lipoma | A47J 36/2411 165/222 |
| 2015/0150761 | A1 * | 6/2015 | Lanternari | A23C 3/023 426/115 |
| 2015/0245737 | A1 * | 9/2015 | Chigusa | A47J 36/2433 219/419 |
| 2017/0086620 | A1 * | 3/2017 | Duineveld | A47J 36/2438 |
| 2017/0245678 | A1 * | 8/2017 | Wakeham | F25D 3/08 |
| 2018/0020871 | A1 * | 1/2018 | Van Wieringen | A47J 36/2483 426/231 |
| 2018/0255966 | A1 * | 9/2018 | Moore | A47J 36/2433 |
| 2019/0231122 | A1 * | 8/2019 | Hanneken | A47J 36/2483 |
| 2019/0285338 | A1 * | 9/2019 | Chintala | F25D 31/005 |

FOREIGN PATENT DOCUMENTS

| | | | |
|---|---|---|---|
| DE | 4014569 A1 | 11/1991 | |
| TW | M482399 U | 7/2014 | |
| WO | WO-2004/054414 A1 | 7/2004 | |
| WO | WO-2014/190475 A1 | 12/2014 | |
| WO | WO-2015/173042 A1 | 11/2015 | |
| WO | WO-2015173042 A1 * | 11/2015 | .......... A47J 36/2438 |
| WO | WO-2016/133421 A1 | 8/2016 | |
| WO | WO-2016/160019 A1 | 10/2016 | |

* cited by examiner

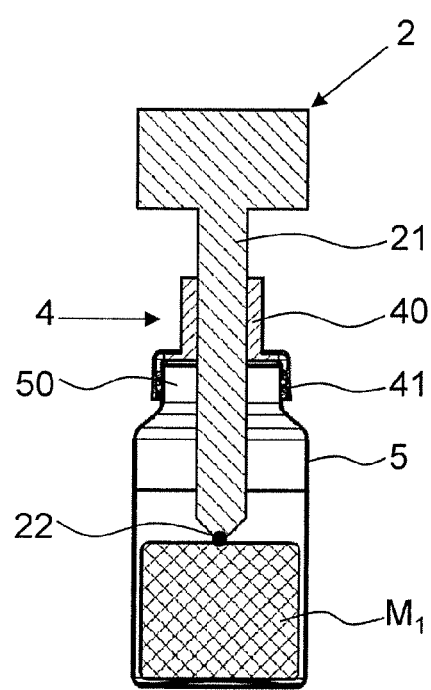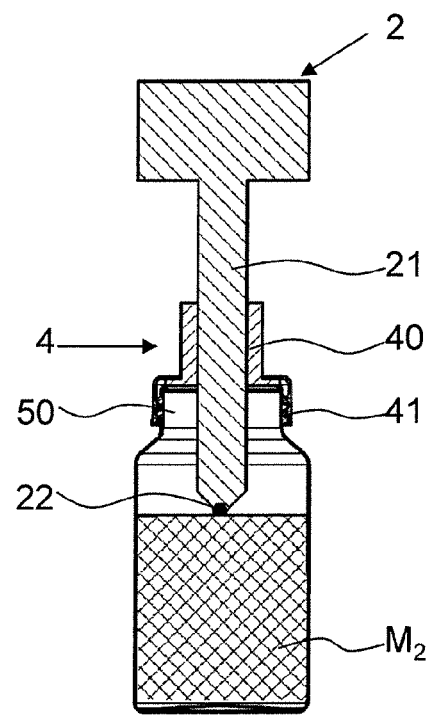
FIG. 5  FIG. 6
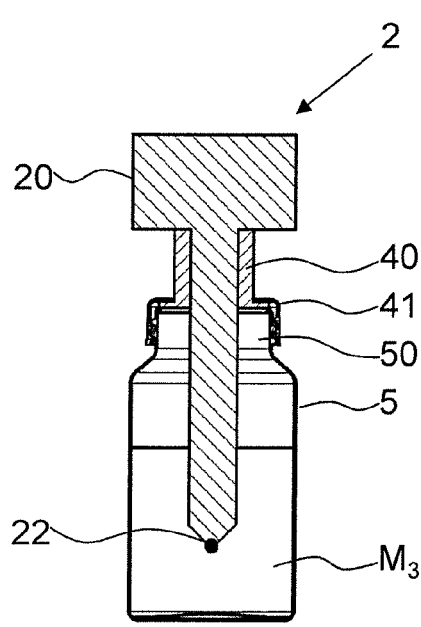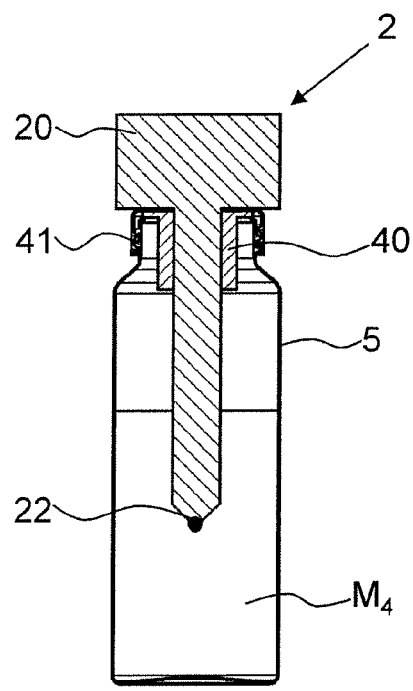
FIG. 7  FIG. 8

DEVICE FOR BRINGING BABY FOOD TO A CERTAIN TEMPERATURE

CROSS-REFERENCE TO RELATED APPLICATION

This present application is the US national phase of International Patent Application No. PCT/EP2017/082225, filed Dec. 11, 2017, which claims priority to European Application No. 16204285.7, filed Dec. 15, 2016. The priority application, EP 16204285.7, is hereby incorporated by reference in its entirety.

TECHNICAL FIELD

The present invention relates to a device and a method for bringing baby food to a certain temperature.

PRIOR ART

When administering baby food, it is important that the food be within a relatively narrow temperature range so that it is well tolerated by the baby. This relates, in particular, to fluids such as expressed breast milk, milk composed of other milk products, or tea.

Various bottle warmers are known from the prior art, which make it possible to heat baby food, in particular liquids, to a predetermined temperature.

U.S. Pat. No. 2,756,031 A discloses a bottle warmer having a vessel for the baby bottle. The vessel is filled with water which is heated by means of a heating coil which is disposed in the vessel and surrounds the inserted bottle. US 2008/0199164 A1 describes a somewhat more modern bottle warmer having a fluid-filled vessel for accommodating the bottle. A sensor in the wall of the vessel measures the temperature of the heating fluid.

US 2009/0208193 A1 describes a bottle warmer which heats the bottle with air flowing around it.

WO 2016/133421 A1 describes a bottle warmer having a chamber, in which the baby bottle is rotated while lying on its side and is heated by means of microwaves. An infrared sensor disposed at an outlet of the chamber detects the infrared radiation sporadically emitted from the baby bottle, in order to thereby determine and control the temperature of the baby food.

DE 40 14 569 A1 discloses a baby bottle attachment for measuring temperature, wherein an LCD display displays the measured temperature.

WO 2016/160019 A1 discloses a baby bottle having a heating element integrated in the base of the bottle. WO 2004/054414 A1 also describes a baby bottle having a heating element which, however, is located at the mouth of the bottle, and so the outflowing milk is heated.

US 2014/0073252 A1 proposes transmitting temperature values from a baby bottle to a smartphone.

Expressed breast milk is usually stored in the refrigerator or frozen up until the point of use. Heating to the desired temperature takes a correspondingly long period of time. In a rush, the milk is often overheated, which can adversely affect the quality of the milk.

DESCRIPTION OF THE INVENTION

It is therefore an object of the invention to make it possible to bring the temperature of baby food to a predefined temperature in a manner which is as efficient as possible yet is also gentle.

The device according to the invention for bringing baby food to a certain temperature comprises a vessel having an interior for accommodating a holder for the baby food, a unit for obtaining a temperature for bringing the interior to a certain temperature, and a first sensor for determining the temperature in the interior. Furthermore, a sensor unit, which comprises a second sensor for determining the temperature of the baby food in the container, is present.

The interior is preferably heated or cooled by means of a fluid for raising or lowering a temperature, which is located in or introduced into the interior. Water and air that has been brought to a certain temperature, for example, are suitable as a fluid for raising or lowering a temperature, wherein water is preferred.

The baby food can be solid or liquid. In preferred examples, the baby food is expressed breast milk or another type of baby milk. It can also be tea or water, for example. The food can be frozen or cooled, for example, or can be at room temperature. The food is usually heated. Depending on the embodiment of the device, the food can be alternatively or additionally cooled, however, in order to reach the desired predefined temperature of the baby food.

In simple embodiments, once the temperature of the baby food has been reached, i.e., after a corresponding display by the second sensor, the device can be manually or automatically switched off, wherein the container having the baby food is preferably removed from the vessel or the fluid for raising or lowering a temperature is removed from the interior.

In further embodiments, an electronic unit is present, which controls the unit for obtaining a temperature. In one simple embodiment, only the measured values from the first sensor are used for this purpose. The first sensor determines the temperature in the interior, preferably determining the temperature of the fluid for raising or lowering a temperature. In more highly preferred embodiments, the measured value from the second sensor is used for switching off the unit for obtaining a temperature as soon as the temperature of the baby food has reached a predefined value.

In preferred embodiments, the measured values from the first and the second sensors are used for controlling the unit for obtaining a temperature. The term "control" is intended to be broadly interpreted and, depending on the embodiment, also includes the term "regulation". The use of the measured values from both sensors preferably takes place in real time and preferably simultaneously. Preferably, a weighted mean value of a measured value from the first sensor and a measured value from the second sensor is used. Due to the use of the measured values from both sensors for controlling the unit for obtaining a temperature, the temperature of the baby food can be brought to a certain temperature in a highly efficient and gentle manner, in particular warmed or held within a certain temperature range for a relatively long time.

Preferably, the first sensor is fixed in position in the interior. The first sensor can extend into the interior. Preferably, the first sensor is protected in a separate area or is situated in the wall of the housing.

The sensor unit comprising the second sensor can also be disposed on the vessel and can be insertable into the container, e.g., via a swivel arm. Preferably, however, the sensor unit having the second sensor is a separate part. The second sensor is preferably a mobile sensor which is designed for placement in the container.

The sensor unit preferably has at least one display for displaying an attainment of a predefined temperature. The display is an acoustic display, for example. For example, a sound can be generated as soon as the predefined temperature of the baby food has been reached. The display is, for example, alternatively or additionally, an optical display. In one embodiment, a display is present, which displays the measured temperature of the baby food. In another embodiment, at least one light is present, which provides a visible indication that the predefined temperature has been reached or not.

In preferred embodiments, the sensor unit comprises the second sensor as well as a sensor head and a sensor rod disposed thereon, wherein the sensor rod is provided with the second sensor for determining the temperature of the baby food. Such a design of the sensor unit allows for a simple insertion into the container of baby food, in particular into a bottle.

Furthermore, the sensor unit can rest with the sensor head on a container neck or an adapter part.

In preferred embodiments, the device comprises an adapter part having a through-hole, by means of which the sensor unit can be fastened in a position in which it is at least partially inserted into the container. The device can also comprise a set of different adapters so that the sensor unit can be fastened in differently shaped containers. The adapter part can be connected to the vessel. Preferably, however, it forms a part which is separate from the vessel, as is also the case with the sensor unit.

The adapter part is preferably designed to be fastened on the container. Preferably, the adapter part comprises a flange having an internal thread, in order to be screwed onto an external thread of a container neck.

In preferred embodiments, the adapter part has two fastening positions for fastening the sensor unit in the container, wherein the sensor unit extends into the container to different extents depending on the two fastening positions. This can be achieved in different ways. Preferably, the adapter part comprises at least two elements, wherein a first element is a spacer which spaces the sensor head from the fastening point of the adapter part to a greater or lesser extent depending on the arrangement relative to a second element of the adapter part. As a result, a sensor element carrying out the measurement can be lowered either deep into or less deep into the interior of the container.

Preferably, the sensor unit is held so as to be displaceable in a longitudinal direction within the adapter part. In one first embodiment, this displaceability takes place exclusively as a result of manual pressure. In yet another embodiment, the sensor head or another upper region of the sensor unit is designed to be so heavy, however, that the sensor unit automatically slides, along the adapter part, downward into the container until either its lower end rests on a surface or until the sensor head or the upper region rests on the adapter part. This is advantageous, in particular, when the temperature of frozen contents in the container is supposed to be measured. On the one hand, the second sensor can rest on the frozen surface at the beginning of the measurement and thereby determine the temperature on the surface. On the other hand, as soon as the baby food melts, the second sensor slides downward along with the still-unthawed surface of the baby food until the second sensor can then plunge into the thawed baby food. It is furthermore advantageous that the second sensor presses the still-unthawed baby food downward into the already-heated fluid, which promotes rapid thawing.

In one preferred embodiment, the premature contact by the second sensor is detected. The frozen state is detected and the device automatically uses a gentle but efficient thawing program. Alternatively, the frozen state can also be easily detected by way of the measured temperature and can be further used in the device.

The sensor unit can have a separate energy source. The sensor unit can be connected via a cable to an energy source, e.g., an external battery. The battery is preferably situated in a housing or a base of the vessel. Preferably, the sensor unit comprises an integrated energy store, e.g., a battery.

In yet another embodiment, an energy source for a sensor unit is present in the vessel, wherein the energy is wirelessly transmitted via inductance into the sensor unit. This arrangement has the advantage that no batteries are required. In addition, this type of energy transmission prevents a use of the sensor unit without an associated vessel.

The measured values can be transmitted via cable or wirelessly to the electronic unit. Preferably, at least the sensor unit comprises such wireless transmission elements.

In one preferred embodiment, the device comprises transmitting means, in order to transmit an attainment of a predefined temperature to an external intelligent mobile device (mobile smart device) such as, e.g., a smartphone. Depending on the embodiment, the transmitting means are present in the second sensor and/or in the electronic unit.

In the method according to the invention for bringing baby food to a certain temperature using the above-described device, the temperature in the interior is determined using the first sensor, and the temperature of the baby food in the container is determined using the second sensor. In one simple embodiment, the measured values are not used for a timely control or regulation of the unit for obtaining a temperature, but rather the measured values are merely intended to prompt the user and/or the electronic unit of the device to shut off the device in a timely manner and remove the container with the baby food. In preferred embodiments, the measured values from at least one of the two sensors, preferably both sensors, are used by the electronic unit for controlling the unit for obtaining a temperature. If measured values from both sensors are used, then weighted mean values are preferably used.

A further device according to the invention for bringing baby food to a certain temperature comprises a vessel having an interior for accommodating a holder for the baby food, a unit for obtaining a temperature for controlling the temperature of the interior, and an electronic unit for controlling the unit for obtaining a temperature. This device comprises a sensor for determining the temperature of the baby food in the container, wherein the electronic unit controls the unit for obtaining a temperature in accordance with measured values from this sensor. The sensor is therefore situated in the container and, in the method according to the invention, the measured values from this sensor are used for controlling the unit for obtaining a temperature.

BRIEF DESCRIPTION OF THE DRAWINGS

Preferred embodiments of the invention are described in the following with reference to the drawings which are intended merely for the purpose of explanation and are not intended to be interpreted to be limiting. In the drawings:

FIG. 5 shows a small container of frozen baby food, comprising an adapter part and the sensor unit;

FIG. 6 shows a large container of frozen baby food, comprising an adapter part and the sensor unit;

FIG. 7 shows a small container of liquid baby food, comprising an adapter part and the sensor unit;

FIG. 8 shows a large container of liquid baby food, comprising an adapter part and the sensor unit.

DESCRIPTION OF PREFERRED EMBODIMENTS

Figure 1:
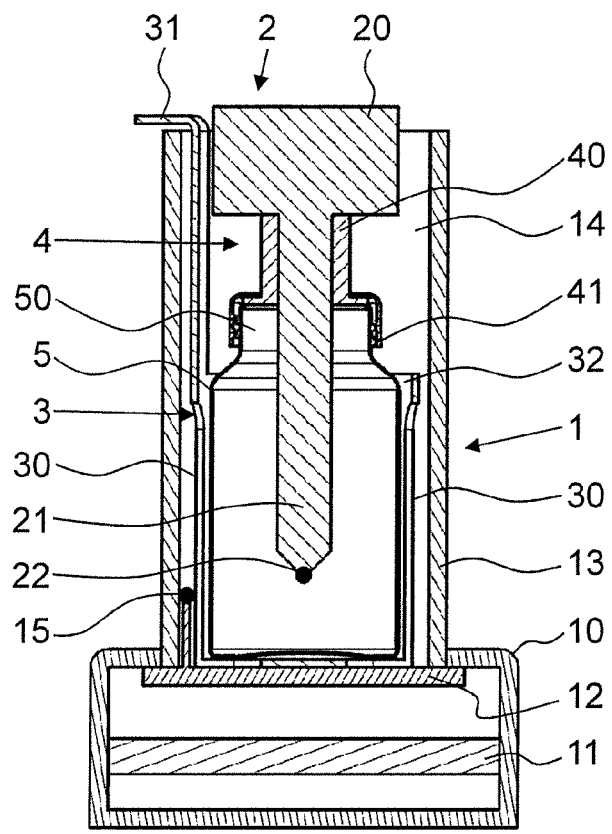
FIG. 1 shows a longitudinal section of a schematic representation of a device according to the invention, having a small container.

FIG. 1 shows a first exemplary embodiment of the device according to the invention. The device comprises a vessel 1 having an electronic unit 11, a unit for obtaining a temperature 12, and a first sensor 15, as well as a mobile sensor unit 2 having a second sensor 22 and a lifting basket 3. Sensors of the type NTC, linear PTC, platinum R, semiconductors and IC's are suited, in particular, as the first and second sensors 15, 22.

The vessel 1 preferably has a base part 10, which is also referred to as a base, and a container-accommodating body 13 extending above this base part 10. The container-accommodating body 13 is preferably cylindrical and has an interior 14, which is open toward the top, for accommodating a container 5 for baby food.

In this example, the container 5 is a baby bottle having a bottle body and a bottle neck 50, onto which the nipple is placed for administering food. The container 5 can be placed directly into the interior 14. The lifting basket 3 is preferably used for this purpose, however. The lifting basket comprises an accommodating part 30 for holding the container 5, and a handle 31 for the easy use of the basket.

The electronic unit 11 and the unit for obtaining a temperature 12 are preferably situated in the base part 10. The unit for obtaining a temperature 12 is a unit, which is known in the prior art, for heating or—depending on the embodiment—for cooling the interior 14 or a fluid located therein. Preferably, the temperature-control unit is formed by an electric heating coil or an electric heating plate. A suitable energy source, e.g., a battery, or an electric connector for an electric mains is present in the base part.

The first sensor 15 is situated in the interior 14. The sensor is connected to the electronic unit 11 wirelessly or via a line and transmits measurement data to this electronic unit 11. The electronic unit 11 is connected to the unit for obtaining a temperature 12 in order to control the performance of raising or lowering a temperature, in particular the heating performance, in accordance with the temperature values measured by the first sensor 15 and/or the second sensor 22.

The sensor unit 2 comprises the second sensor 22 and a sensor head 20 having a first diameter, and a sensor rod 21 having a second diameter. The first diameter is preferably greater than the second diameter.

The second sensor 22 is situated on the end of the sensor rod 21 that does not have a sensor head. The sensor rod is inserted into the baby food or contacts a surface of the baby food and thereby measures its temperature. The measured values are then transmitted either wirelessly or via cable to the electronic unit.

An adapter part 4 holds the sensor unit 2 in a desired position. The adapter part 4 has a through-hole, through which the sensor rod 21 is passed. The sensor head 20 rests on the adapter part 4 and is thereby held by the adapter part.

As a result, the second sensor 22 extends into a zone which is spaced from the walls of the container, and can optimally determine the temperature of the baby food. The adapter part 4 is fastened on the container neck 50. Preferably, the adapter part is screwed thereon or inserted thereon.

The adapter part 4 preferably enables the second sensor 22 to be held in at least two stable positions. This is advantageous when different sizes of containers are used. The adapter part 4 is preferably formed from multiple parts. In this example, the adapter part is formed from two parts. Said adapter part comprises a fastening body 41, preferably a threaded ring, and a spacer 40. The spacer 40 essentially consists of a hollow cylinder and an end-face, outwardly extending flange. The adapter part 4 is preferably produced from plastic.

The shape of the adapter part 4 changes, depending on how the spacer 40 is connected to the threaded ring 41. In FIG. 1, the container 5 is a relatively small baby bottle. The spacer 40 is oriented with the flange pointing downward. The threaded ring clamps the flange between itself and the container neck 50. The hollow cylinder of the spacer 40 extends upward and thereby lengthens the container 5. The sensor head 20 rests on the spacer 40, and the lower free end of the sensor rod 21 terminates as a distance from the walls of the container 5, in its interior 51.

Figure 2:
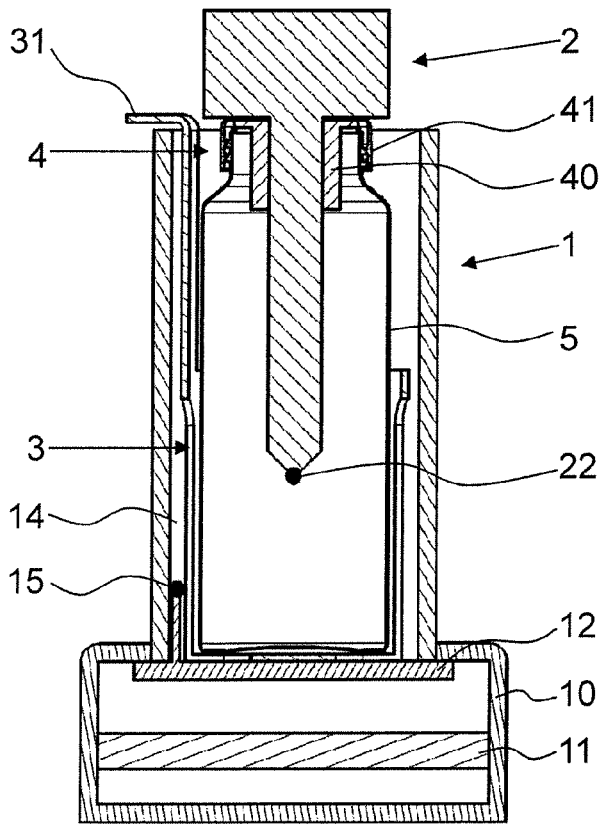
FIG. 2 shows the longitudinal section according to FIG. 1, having a large container.

A large container is depicted in FIG. 2. The adapter part 4 is configured differently in this case. The flange of the spacer 40 points upward, wherein the flange is therefore clamped between the threaded ring 41 and the upper end face of the container neck 5. The hollow cylinder of the spacer 40 now points downward, however. The sensor head 20 therefore rests on the threaded ring. In this case as well, the free end of the sensor rod 21 terminates at a distance from the walls of the container 5.

Figure 3:
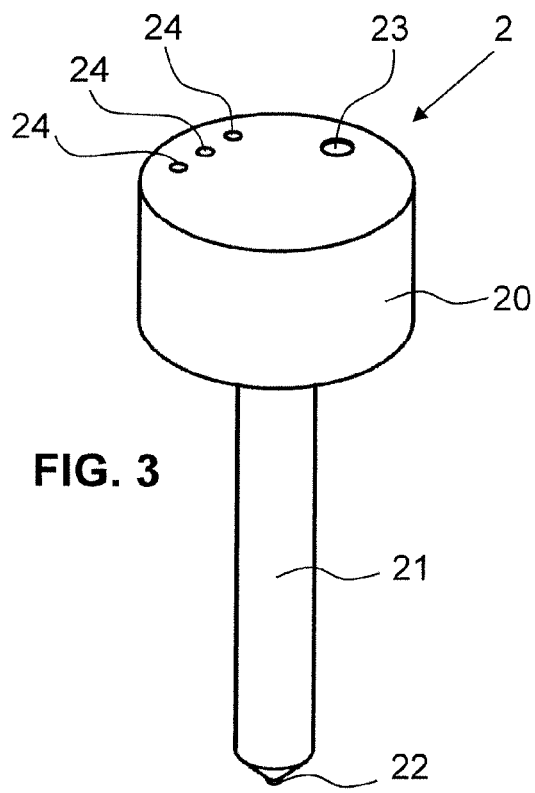
FIG. 3 shows a schematic, perspective representation of a sensor unit according to the invention.
Figure 4:
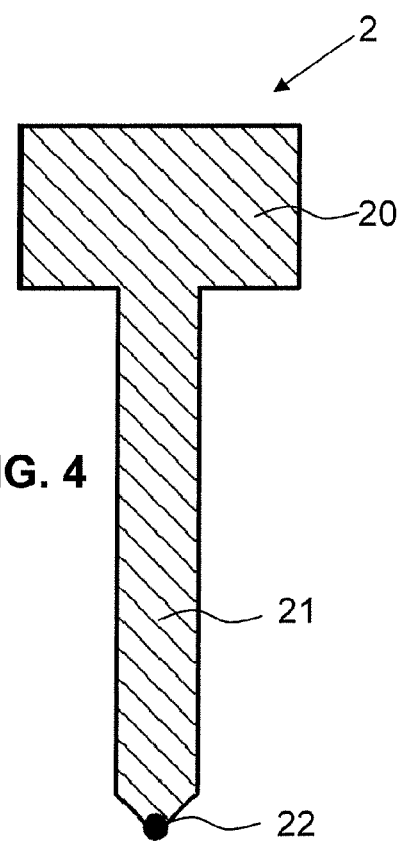
FIG. 4 shows a longitudinal section of the sensor unit according to FIG. 3.

FIGS. 3 and 4 show the mobile sensor unit 2. In FIG. 3, it is apparent that the sensor unit, preferably the sensor head 20, can be provided with at least one display. In this example, an acoustic signal generator 23 is present, which indicates the attainment of a predefined temperature of the baby food and/or reports disturbances. The reference numbers 24 refer to optical displays. The optical displays can be, for example, different-colored LEDs which display the operating state, the progress of the heating, and the attainment of the predefined temperature of the baby food. It is also possible, of course, that the sensor unit 2 comprises a display having temperature information and/or diagrams of the heating progress. The same applies in the case of cooling.

Different types of baby food are depicted in FIGS. 5 to 8. FIGS. 5 and 6 show the position of the second sensor 22 which has been inserted into the container 5, in the case of a frozen baby food $M_1$, $M_2$. In this case, the sensor head 20 does not rest on the spacer 40 or the threaded ring 41, since the free end of the sensor rod 21 has already been resting on the frozen surface. During the thawing of the baby food, the sensor rod 21 slides downward, along the adapter 4, until the sensor head 20 comes to rest again and the free end of the sensor rod 21 is surrounded by the baby food. This situation is apparent in FIGS. 7 and 8.

Figure 9:
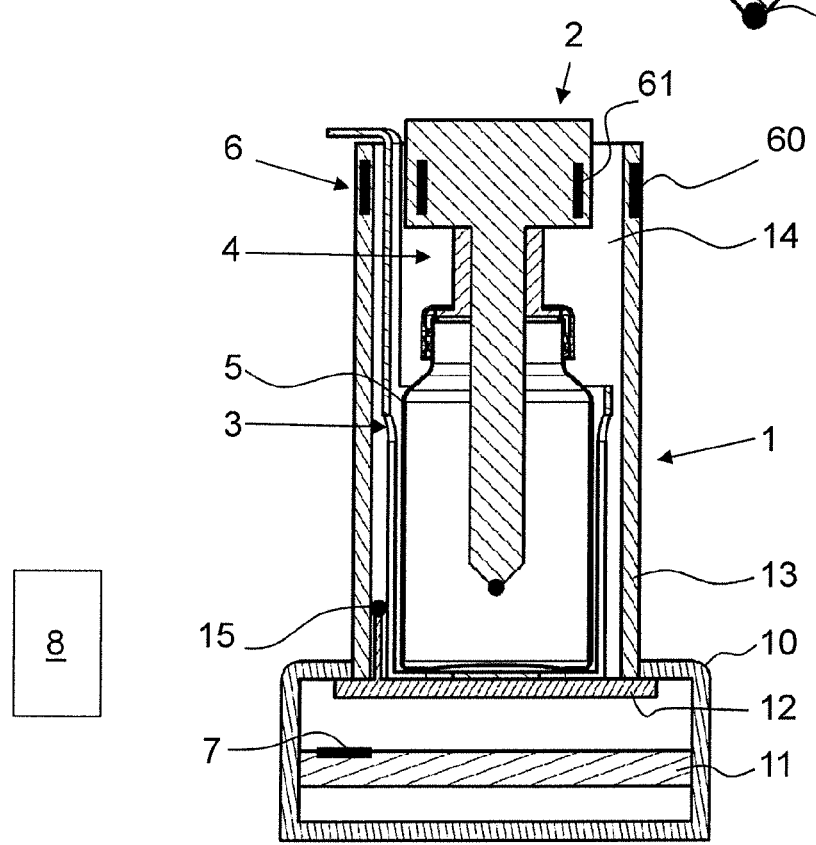
FIG. 9 shows a longitudinal section of a schematic representation of a device according to the invention, according to a second embodiment.

FIG. 9 shows one variant of the exemplary embodiment according to FIG. 1. Instead of an energy source integrated in the sensor unit 2, or instead of a power cable between the sensor unit 2 and the vessel 1, an induction module 6 is present. The vessel 1 is provided with a corresponding first induction coil 60, and the sensor unit 2 is provided with a second induction coil 61. If the sensor unit 2 is located in the vessel 1 and if the vessel 1 is activated, the sensor unit 2 is supplied with electric energy and the second sensor 22 can carry out the necessary measurements. In addition, a transmitting means 7 for transmitting temperature information, and a smart device 8 for receiving temperature information are depicted in the base 10. These can also be used without an induction module 6. In addition, the transmitting means 7 can be additionally designed as a receiving means, in order to receive, for example, information and parameters from the smart device 8 or another information source. Information on the desired temperature or on the container used, for example, can be transmitted.

The device according to the invention is utilized as follows. A heatable fluid, preferably water, is filled into the interior 14 of the container-accommodating body 13. Alternatively, the vessel can also be designed, for example, for heating or cooling the interior by means of air that has been brought to a certain temperature. Preferably, the fill volume of the interior as well as the volume of the baby food are known, and these data can be entered directly into the electronic unit or can be directly detected by the electronic unit, for example, by an integrated scale. The volume of the fluid for raising or lowering a temperature, which has been added, preferably approximately corresponds to the volume of the baby food.

If the device is now switched on, both sensors 15, 22 measure the corresponding temperatures, wherein the temperature of the baby food is referred to in the following as $T_M$, and the temperature of the fluid for raising or lowering a temperature is referred to as $T_W$. The electronic unit calculates, preferably by means of a controller contained therein, a weighted temperature mean value corresponding to the ratio of the volumes of the two measuring media $$T_{Regulator}=(x*T_M+y*T_W)/2.$$

By means of this mean value $T_{Regulator}$, the unit for obtaining a temperature is now regulated and the heating performance or, if necessary, the cooling performance, is adjusted accordingly. If only the measured values from one of the two sensors is used for the control, the calculation of the mean value is dispensed with, and the measurement data from the one sensor are utilized either directly or averaged over a period of time.

The device according to the invention and the method according to the invention make it possible to bring baby food to a certain temperature in a manner that is gentle, yet efficient.

The invention claimed is:

1. A device for bringing baby food to a certain temperature, wherein the device comprises:
    a vessel having an interior comprising a media having a first volume and for accommodating a container for the baby food having a second volume;
    a unit for heating and/or cooling the interior;
    a first sensor for measuring a temperature of the media in the interior;
    a sensor unit having a second sensor for measuring a temperature of the baby food in the container; and
    an electronic unit for controlling the unit for heating and/or cooling the interior in accordance with (i) measured values from the first sensor and (ii) measured values from the second sensor in order to bring the baby food to the certain temperature, wherein the electronic unit calculates a weighted temperature mean value of the measured values from the first sensor and the second sensor corresponding to a ratio of the first volume and the second volume, and wherein the electronic unit regulates the unit for heating and/or cooling the interior based upon the calculated weighted temperature mean value.

2. The device according to claim 1, wherein the first sensor is fixed in position in the interior.

3. The device according to claim 1, wherein the second sensor is a positionable sensor configured for arrangement in the container.

4. The device according to claim 1, wherein the sensor unit further comprises at least one display for displaying an attainment of a predefined temperature.

5. The device according to claim 1, wherein the sensor unit further comprises a sensor head and a sensor rod situated thereon, wherein the sensor rod is includes the second sensor for determining the temperature of the baby food.

6. The device according to claim 1, wherein the device further comprises an adapter part having a through-hole by means of which the sensor unit can be fastened in a state at least partially inserted into the container.

7. The device according to claim 6, wherein the adapter part configured to be fastened on the container.

8. The device according to claim 7, wherein the adapter part has two fastening positions for fastening the sensor unit in the container, wherein the sensor unit extends into the container to different extents depending on the two fastening positions.

9. The device according to claim 6, wherein the sensor unit is displaceable in a longitudinal direction within the adapter part.

10. The device according to claim 1, wherein the vessel further comprises an energy source for the sensor unit.

11. The device according to claim 1, wherein the device further comprises a transmitting means in order to transmit an attainment of a predefined temperature to a mobile smart device.

12. A method for bringing baby food to a certain temperature in a device, the device comprising a vessel having an interior comprising a media having a first volume and for accommodating a container for the baby food having a second volume, a unit for heating and/or cooling the interior, and an electronic unit for controlling the unit for heating and/or cooling the interior, wherein the method comprises:
    measuring temperatures of the media in the interior using a first sensor;
    measuring temperatures of the baby food in the container using a second sensor;
    calculating a weighted temperature mean value of the measured values from the first sensor and the second sensor corresponding to a ratio of the first volume and the second volume; and
    using the calculated weighted temperature mean value in the electronic unit for regulating the unit to bring the baby food to the certain temperature.

* * * * *

UNITED STATES PATENT AND TRADEMARK OFFICE
CERTIFICATE OF CORRECTION

PATENT NO. : 11,000,151 B2
APPLICATION NO. : 16/470112
DATED : May 11, 2021
INVENTOR(S) : Etienne Furrer et al.

Page 1 of 1

It is certified that error appears in the above-identified patent and that said Letters Patent is hereby corrected as shown below:

In the Claims

Column 8, Line 19, "is includes" should read -- includes --.

Column 8, Line 27, "configured" should read -- is configured --.

Signed and Sealed this
Eighteenth Day of January, 2022

Drew Hirshfeld
*Performing the Functions and Duties of the
Under Secretary of Commerce for Intellectual Property and
Director of the United States Patent and Trademark Office*